United States Patent [19]
Kato et al.

[11] Patent Number: 5,131,486
[45] Date of Patent: Jul. 21, 1992

[54] POWER STEERING CONTROL VALVE MECHANISM

[75] Inventors: Masaaki Kato; Yoshihito Imura, both of Aichi, Japan

[73] Assignee: TRW Steering & Industrial Products Co., Ltd. (Japan), Tokyo, Japan

[21] Appl. No.: 627,701

[22] Filed: Dec. 14, 1990

[30] Foreign Application Priority Data

Dec. 18, 1989 [JP] Japan .................. 1-146316[U]

[51] Int. Cl.$^5$ ............................. B62D 5/06
[52] U.S. Cl. .................. 180/132; 180/149; 91/375 A; 74/388 PS
[58] Field of Search ........... 180/132, 147, 146, 149; 74/388 PS; 91/375 A

[56] References Cited

U.S. PATENT DOCUMENTS

| | | | |
|---|---|---|---|
| 4,198,898 | 4/1980 | Elser | 74/388 PS X |
| 4,469,342 | 9/1984 | Millard | 74/388 PS X |
| 4,561,521 | 12/1985 | Duffy | 91/375 A X |
| 4,582,086 | 4/1986 | Bacardit | 91/375 A X |
| 5,029,513 | 7/1991 | Duffy | 91/375 A X |

Primary Examiner—Charles A. Marmor
Assistant Examiner—Kevin Hurley
Attorney, Agent, or Firm—Tarolli, Sundheim & Covell

[57] ABSTRACT

In a hydraulic pressure switch mechanism connected between a steering shaft and a rack, an input shaft is covered with a balance sleeve, to form a sealing portion. The balance sleeve is covered with a valve outer spool, thereby forming a variable orifice. The hydraulic pressure switch mechanism requires no valve inner spool. The hydraulic pressure switch mechanism has a small and simple structure and provides secure hydraulic pressure control, thus contributing to reduction in manufacturing cost.

16 Claims, 3 Drawing Sheets

POWER STEERING CONTROL VALVE MECHANISM

BACKGROUND OF THE INVENTION

This invention relates to a hydraulic switch mechanism for an automotive vehicle power steering device.

A related-art hydraulic switch mechanism for a power steering device is shown in FIGS. 5 through 7. In a hydraulic pressure switch mechanism 50, an input shaft 51 is arranged concentrically with an output shaft 52 having a cylindrical shape. The input shaft 51 comprises a small-diameter cylindrical portion 51a and a large-diameter cylindrical portion 51b. An end of the small-diameter cylindrical portion 51a is connected to the large diameter cylindrical portion 51b, and the other end of the small-diameter cylindrical portion 51a is geared to a steering shaft (not shown). The output shaft 52 has on its outer periphery a pinion 53 which meshes with a rack 54 for driving vehicle wheels. As shown in FIG. 5, the upper portion of the output shaft 52 above the pinion 53 is inserted around the large-diameter cylindrical portion 51b of the input shaft 51 via an elastic pre-loaded spring ring 55 (hereinafter referred to as the C ring). In a cutout in the C ring 55, a drive pin 56 on the large-diameter cylindrical portion 51b engages an engaging portion 52a of the output shaft 52. A valve inner spool 57 loosely extends through the output shaft 52. The upper portion of the valve inner spool 57 is attached via a drive pin 58 to the small-diameter cylindrical portion 51a of the input shaft 51. The lower portion of the valve inner spool 57 extends downward from the output shaft 52. The valve inner spool 57 includes a projection 57a having a square cross section. A hydraulic passage 59 is provided between opposite walls of the projection 57a. Each corner of the projection 57a is chamfered to form a sealing portion 60. A valve outer spool 61 surrounds the projection 57a and engages the output shaft 52 via a drive pin 63. As shown in FIG. 7, when an automotive vehicle drives straight ahead and the input shaft 51 as well as the valve inner spool 57 do not rotate, four hydraulic passages 61a are connected to a hydraulic cylinder (not shown) for axially moving the rack 54 and two hydraulic passages 61b are connected to a hydraulic pump (not shown). A valve casing 62 includes a hydraulic groove 62a connected to the hydraulic pump.

In operation, when the automotive vehicle turns, the projection 57a of the valve inner spool 57 rotates relative to the valve outer spool 61, and the sealing portion 60 contacts an inner periphery of the valve outer spool 61 for oil sealing. When the automotive vehicle is steered and the input shaft 51 rotates relative to the output shaft 52, the C ring 55 generates a torque that acts to produce rotation in a steering wheel.

The hydraulic switch mechanism 50 has the following problems.

(1) The projection 57a of the valve inner spool 57 and the valve outer spool 61 are arranged below the rack 54 and opposite to the steering shaft. The hydraulic switch mechanism 50 has such a large size and complicated structure.

(2) Since the valve inner spool 57 extends through the output shaft 52, the pinion 53 must be thick, thereby increasing the weight of the hydraulic switch mechanism 50.

SUMMARY OF THE INVENTION

An object of the invention is to provide a hydraulic pressure switch mechanism for a power steering device that has a small and simple structure and performs an efficient hydraulic switch function.

To attain this or other object, the invention provides a power steering device comprising a cylindrical input shaft connected to a steering shaft, an output shaft concentric with the input shaft and connected via a pinion to a rack for driving vehicle wheels, a cylinder for axially moving the rack, and at least either of a C ring inserted onto one end of the output shaft and engaged with the input shaft and the output shaft in its cutout portion and a torsion bar with both ends connected to the input shaft and the output shaft, respectively. The power steering device is provided with a hydraulic switch mechanism comprising a balance sleeve secured onto the input shaft, a valve outer spool loosely fit onto the balance sleeve and engaged to the output shaft, a hydraulic passage in the valve outer spool for connecting with a hydraulic pump and the cylinder, a hydraulic passage in the input shaft and the balance sleeve for connecting to the hydraulic passage in the valve outer spool, and a sealing portion composing a variable orifice between the balance sleeve and the oil passage of the valve outer spool according to the rotation of the input shaft. When an automotive vehicle drives straight forward, the variable orifice inhibits oil from being supplied to or discharged from the cylinder. When the automotive vehicle turns, the variable orifice allows oil to be supplied to and discharged from the cylinder.

DETAILED DESCRIPTION OF A PREFERRED EMBODIMENT

Figure 1:
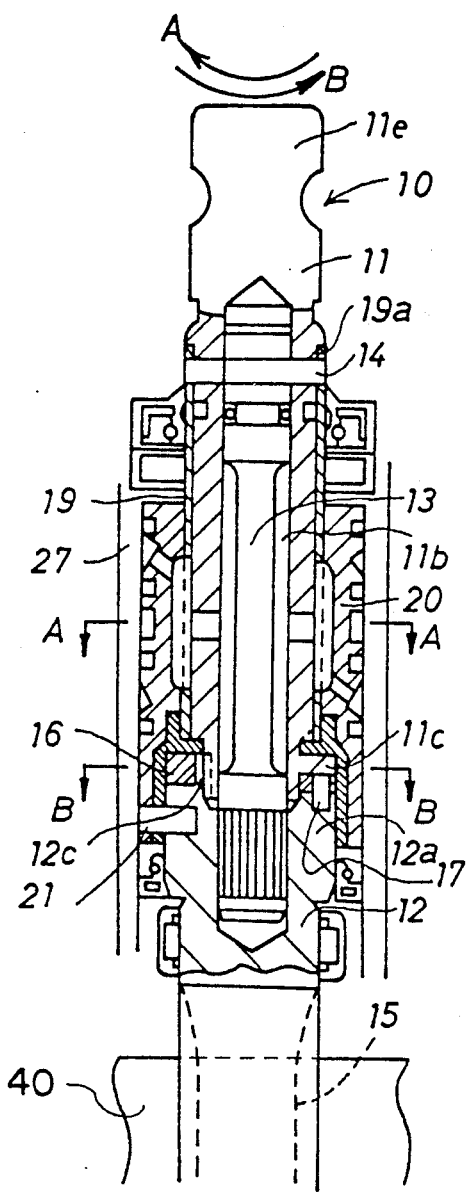
FIG. 1 is a longitudinal front view of a hydraulic pressure switch mechanism embodying the invention.
Figure 3:
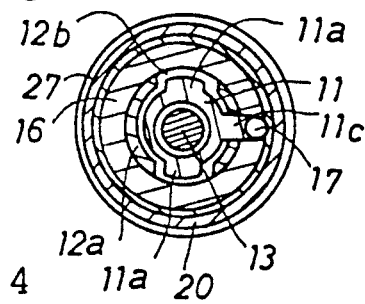
FIG. 3 is a cross-sectional view taken along line B—B in FIG. 1.

As shown in FIGS. 1 and 3, in a hydraulic pressure switch mechanism 10, an input shaft 11 is concentric with an output shaft 12. The lower end of the input shaft 11 forms a projection 11a projecting radially from the center of the input shaft 11. The upper position of the output shaft 12 forms a cylindrical portion 12a. The cylindrical portion 12a is provided with a groove 12b for receiving the projection 11a and allowing the projection 11a to rotate. A torsion bar 13 is concentrically inserted into a hole 11b in the input shaft 11. The lower end of the torsion bar 13 is splined with the cylindrical portion 12a of the output shaft 12. The lower end of the output shaft 12 is connected to a pinion 15. The pinion 15 meshes with a rack (40) for driving vehicle wheels. A step 12c is formed on the upper end of the cylindrical portion 12a of the output shaft 12 and receives a C ring 16. An engaging portion 11c formed perpendicularly to the projection 11a of the input shaft 11 and a drive pin 17 attached onto the output shaft 12 engage in a cutout portion of the C ring 16.

A balance sleeve 19 is inserted onto the outer periphery of the input shaft 11. The upper end of the balance sleeve 19 is secured onto the input shaft 11 via a balance pin 14. The balance pin 14 also secures the torsion bar 13 to the input shaft 11.

A valve outer spool 20 is inserted onto the outer periphery of the balance sleeve 19 such that the valve outer spool 20 can rotate relative to the balance sleeve 19. The valve outer spool 20 engages the output shaft 12 via a drive pin 21 inserted into the output shaft 12. When the output shaft 12 rotates relative to the input shaft 11, the valve outer spool 20 rotates relative to the balance sleeve 19 and the input shaft 11. The valve outer spool 20 is enclosed in a valve casing 27 to obtain oil-tightness.

Figure 2:
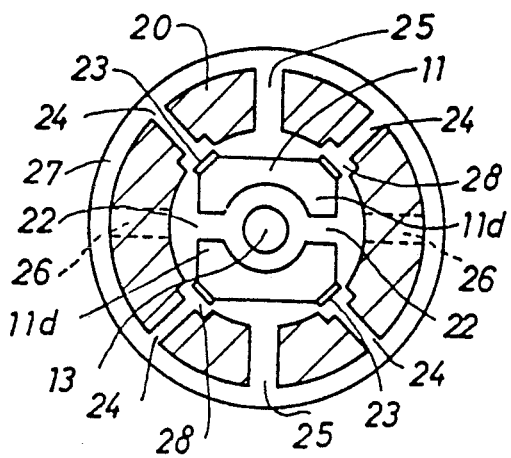
FIG. 2 is a cross-sectional view taken along line A—A in FIG. 1.
Figure 4:
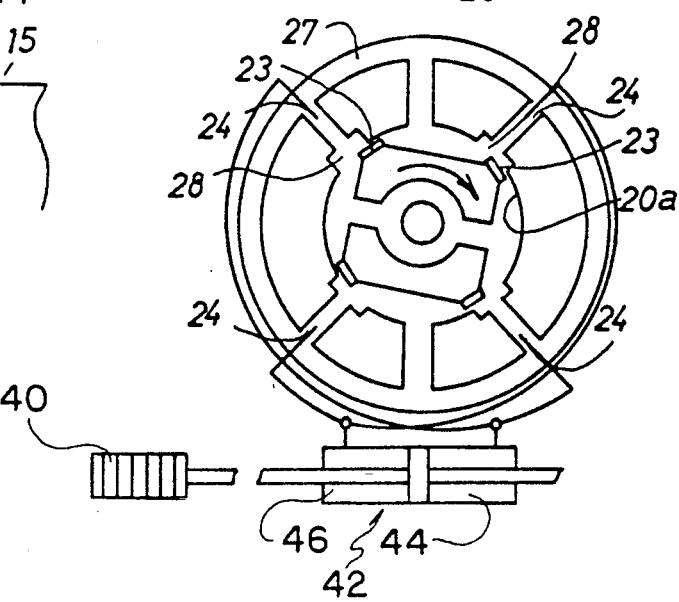
FIG. 4 is an operational view of FIG. 2.
Figure 5:
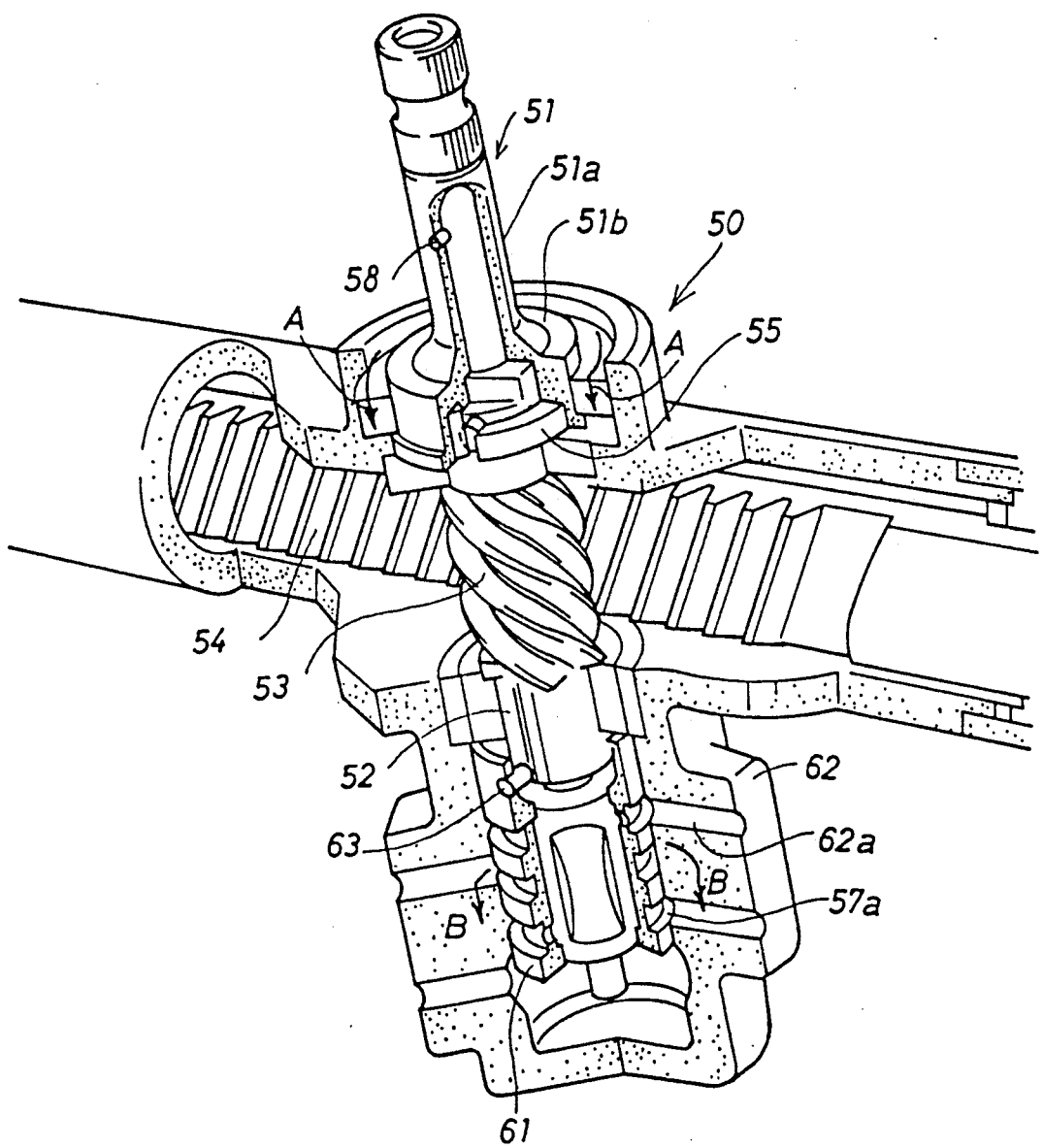
FIG. 5 is a perspective view of a related-art hydraulic pressure switch mechanism.
Figure 6:
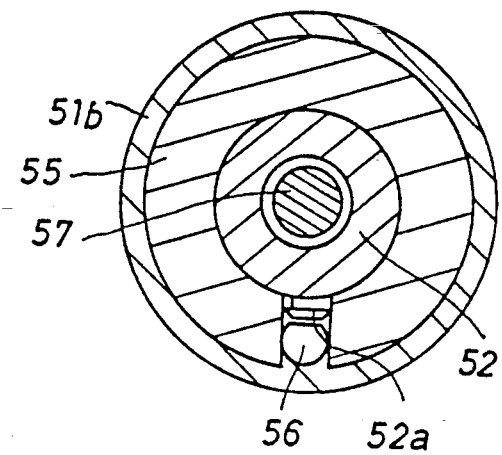
FIG. 6 is a cross-sectional view taken along line A—A in FIG. 5.
Figure 7:
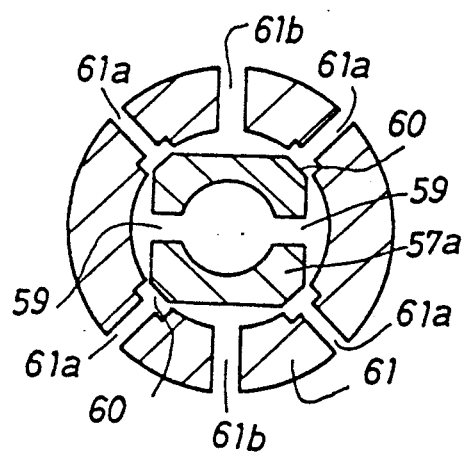
FIG. 7 is a cross-sectional view taken along line B—B in FIG. 5.

As shown in FIG. 2, in the longitudinal middle of the valve outer spool 20, the input shaft 11 has a square cross section. Hydraulic passages 22 are provided between a pair of opposite walls 11d. Each corner of the square cross section is chamfered. The balance sleeve 19 covers the chamfered corners to form sealing portions 23. The balance sleeve 19 is cut out to expose opposite sides of the walls 11d. As shown in FIG. 2, four hydraulic passages or bores 24 are formed in the valve outer spool 20 and opposed to the sealing portions 23. A space between the hydraulic passages 24 and the sealing portions 23 forms a variable orifice 28 variable in area according to the rotation of the input shaft 11. The oil passages 24 connect to a hydraulic cylinder 42 (FIG. 4). Hydraulic passages 25 (FIG. 2) are formed in the valve outer spool 20 perpendicular to the hydraulic passages 22 and connected to a hydraulic pump (not shown). Oil from the hydraulic pump is returned through the hole 11b in the input shaft 11 and a hydraulic passage 26 in the valve outer spool 26 to a hydraulic tank (not shown).

As shown in FIG. 2, when an automotive vehicle drives straight ahead, oil supplied from the hydraulic pump through the hydraulic passages 25 to the hydraulic pressure switch mechanism 10 is returned to the hydraulic tank. If the automotive vehicle turns right, as shown in FIG. 4, the sealing portions 23 contact an inner periphery 20a of the valve outer spool 20, and oil supplied from the hydraulic pump flows via the hydraulic passages 25 and one pair of the opposite hydraulic passages 24 into the right chamber 44 of the hydraulic cylinder 42. Oil from the left chamber 46 of the hydraulic cylinder 42 flows via the other pair of the opposite hydraulic passages 24 to the hydraulic tank. As a result, the rack 40 is moved along its axis and enters power assistance phase. At the same time, the pinion 15 rotates and the angular difference between the input shaft 11 and the output shaft 12 becomes zero.

The setting of the hydraulic pressure switch mechanism 10 into a neutral position is now explained. In the hydraulic pressure switch mechanism 10, the neutral position of the C ring 16 can easily coincide with the neutral position of the sealing portions 23 relative to the valve outer spool 20.

As shown in FIG. 1, a balance pin 14 is disconnected from the hydraulic pressure switch mechanism 10 before the hydraulic pressure switch mechanism 10 is positioned in its neutral position. The input shaft 11 is grasped by its end 11e with an appropriate jig and rotated clockwise and counterclockwise as shown by arrows A and B in FIG. 1. The C ring 16 is then centered and the input shaft 11 are temporarily fastened such that angular position of the input shaft 11 and torque generated by the C ring 16 can be symmetrical.

Subsequently, the balance sleeve 19 is grasped by its end 19a with an appropriate jig and rotated clockwise and counterclockwise as shown by the arrows A and B in FIG. 1. Variances in hydraulic pressure in the variable orifice 28 between the valve outer spool 20 and the balance sleeve 19 are measured according to variances in angular position of the balance sleeve 19. The balance sleeve 19 is centered and temporarily secured such that the hydraulic pressure is balanced.

After the C ring 16 and the variable orifice 28 are thus set in their neutral position, a through hole is made in the input shaft 11, the balance sleeve 19, and the torsion bar 13, and the balance pin 14 is inserted into the through hole to fasten the balance sleeve 19 and the torsion bar 13 to the input shaft 11.

In the embodiment, to apply large initial torque to the input shaft 11 at the time of steering, the torsion bar 13 and the C ring 16 are provided. However, only the torsion bar 13 can be provided, or only the C ring 16 can be provided.

From the above description of a preferred embodiment of the invention, those skilled in the art will perceive improvements, changes, and modifications. Such improvements, changes and modifications within the skill of the art are intended to be covered by the appended claims.

What is claimed is:

1. A control valve for a power steering device having an input shaft connected to a steering shaft, an output shaft connected via a pinion to a rack for moving wheels of a vehicle, and a resilient means for connecting said input shaft to said output shaft, said control valve comprising:

a valve outer spool engaged with said output shaft and concentrically fitted onto an end portion of said input shaft such that said valve outer spool may axially rotate relative to said input shaft;

an oil supply passage defined in said valve outer spool through which oil is supplied from an oil pump;

first and second turning passages defined in said valve outer spool for connecting said oil supply passage to first and second sides, respectively, of a hydraulic cylinder for moving the rack; and sealing means mounted on said end portion of said input shaft for selectively allowing oil flow from said oil supply passage toward the first side of the hydraulic cylinder through said first turning passage or toward the second side of the hydraulic cylinder through said second turning passage, said sealing means comprising a balance sleeve positioned around said end portion of said input shaft.

2. A control valve as recited in claim 1. wherein said sealing means selectively allows oil flow toward either the first or second side of the hydraulic cylinder in response to axial rotation of said end portion of said input shaft relative to said valve outer spool.

3. A control valve as recited in claim 3, wherein
   said sealing means including first and second seals corresponding to said first and second turning passages, respectively; and
   said first and second seals and said first and second turning passages defining variable orifices for varying oil flow toward the first and second sides of the hydraulic cylinder, the amount of oil flow varying in response to relative rotation of said end portion of said input shaft and said valve outer spool.

4. A control valve as recited in claim 1, including:
an oil return passage defined in said valve outer spool through which oil is returned to a hydraulic tank;
said sealing means permitting oil flow from one of the first and second sides of the hydraulic cylinder toward the oil return passage when said end portion of said input shaft and said valve outer spool are relatively rotated to permit oil flow from the supply passage toward the other of the first and second sides of the hydraulic cylinder.

5. A control valve as recited in claim 1, wherein said sealing means permitting oil flow from said oil supply passage toward both of said first and second turning passages.

6. A control valve as recited in claim 5, wherein said control valve has a neutral position in which said sealing means permits oil flow from the oil supply passage toward both of said first and second turning passages such that the hydraulic cylinder does not move the rack.

7. A control valve as recited in claim 6, including:
an oil return passage defined in said valve outer spool through which oil is returned toward a hydraulic tank;
said control valve having a first position in which said sealing means permits oil flow from the second side of the hydraulic cylinder toward said oil return passage and from said supply passage toward the first side of the hydraulic cylinder;
said control valve having a second position in which said sealing means permits oil flow from the first side of the hydraulic cylinder toward said oil return passage and from said supply passage toward the second side of the hydraulic cylinder; and
said control valve having a neutral position in which said sealing means permits oil flow from said supply passage to said return passage.

8. A control valve as recited in claim 7, wherein
said end portion of said input shaft being axially rotatable relative to said valve outer spool through a given range; and
the first, second, and neutral positions corresponding to a first end, a second end, and a middle of the range of relative rotation of said input shaft and said valve outer spool, respectively.

9. A control valve as recited in claim 1, wherein
said end portion of said input shaft is generally rectangular in cross-section;
said sealing means including first, second, third and fourth sealing means formed on each cross-sectional corner of said end portion of said input shaft;
said first turning passage including first and third bores in said valve outer spool diametrically opposed from each other and adjacent to said first and third sealing means on opposite corners of said end portion of said input shaft, respectively; and
said second turning passage including second and fourth bores in said valve outer spool diametrically opposed from each other and adjacent to said second and fourth sealing means on the other two opposing corners of said end portion of said input shaft, respectively.

10. A control valve as recited in claim 9, wherein
said control valve having a neutral position in which oil flows past said first, second, third and fourth bores on both sides of the first, second, third and fourth sealing means;
said control valve having a first position in which oil flows through said first, second, third and fourth bores only past a first side of said first, second, third and fourth sealing means; and
said control valve having a second position in which oil flows through said first, second, third and fourth bores only past a second side of said first, second, third and fourth sealing means.

11. A control valve for a power steering device having an input shaft connected to a steering shaft, an output shaft connected via a pinion to a rack for moving wheels of a vehicle, and resilient means for connecting the input shaft to the output shaft, said control valve comprising:
a valve outer spool engaged with said output shaft and concentrically fitted onto an end portion of said input shaft such that said valve outer spool is axially rotatable relative to said input shaft;
an oil supply passage defined in said valve outer spool through which oil is supplied from an oil pump;
first and second turning passages defined in said valve outer spool for connecting said oil supply passage to first and second sides, respectively, of a hydraulic cylinder for moving the rack;
first and second sealing means corresponding to the first and second turning passages, respectively, mounted on said end portion of said input shaft, said first and second seals and said first and second turning passages defining variable orifices for varying oil flow toward the first and second sides of the hydraulic cylinder, the amount of oil flow varying in response to the relative rotation of said end portion of said input shaft and said valve outer spool, said first and second sealing means comprising a balance sleeve positioned around said end portion of said input shaft; and
said sealing means permitting oil flow toward one of the first and second sides of the hydraulic cylinder from said supply passage and permitting oil flow toward said oil return passage from the other of the first and second sides of the hydraulic cylinder.

12. A control valve as recited in claim 11, wherein
said control valve having a first position wherein oil is permitted to flow from said supply passage toward the first side of the hydraulic cylinder and oil is permitted to flow from the second side of the hydraulic cylinder toward said oil return passage;
said control valve having a second position wherein oil is permitted to flow from said supply passage toward the second side of the hydraulic cylinder and oil is permitted to flow from the first said of the hydraulic cylinder toward said oil return passage; and
said control valve having a neutral position wherein oil is permitted to flow from said supply passage to said return passage.

13. A control as recited in claim 12, wherein
said end portion of said input shaft axially rotates relative to said valve outer spool through a given range; and
the first, second, and neutral positions corresponding to as first end, a second end, and a middle of the range of relative rotation of said input shaft and said valve outer spool.

14. A control valve for a power steering device having an input shaft connected to a steering shaft, an output shaft connected via a pinion to a rack for moving wheels of a vehicle, and resilient means for connecting said input shaft to said output shaft, said control valve comprising:

an end portion formed on an end of said input shaft, said end portion being generally rectangular in cross-section;

first, second, third and fourth sealing means formed on each cross-sectional corner of said end portion of said input shaft, said first, second, third and fourth sealing means being formed by a balance sleeve positioned around said end portion of said input shaft;

a valve outer spool engaged with said output shaft and concentrically fitted onto said end portion of said input shaft such that said valve outer spool may axially rotate relative to said input shaft;

an oil supply passage formed in said valve outer spool through which oil is supplied from an oil pump;

an oil return passage formed in said valve outer spool through which oil is returned to a hydraulic tank;

first, second, third and fourth bores defined in said valve outer spool;

said first and third bores in said valve outer spool being diametrically opposed from each other and adjacent to said first and third sealing means on opposite corners of said end portion of said input shaft, respectively;

said second and fourth bores in said valve outer spool being diametrically opposed from each other and adjacent to said second and fourth sealing means on the other two opposing corners of said end portion of said input shaft, respectively; wherein said first and third bores and first and third sealing means defining a first variable orifice means for varying an amount of oil flow between the first side of the hydraulic cylinder, said oil supply passage, and said oil return passage;

said second and fourth bores and second and fourth sealing means defining a second variable orifice means for varying an amount of oil flow between the second side of the hydraulic cylinder, said oil supply passage, and said oil return passage; and the amount of oil flow through said first and second variable orifice means varying in response to relative rotation of said end portion of said input shaft and said valve outer spool.

15. A control valve as recited in claim 14, wherein said control valve having a first position in which oil is permitted to flow from said supply passage toward the first side of the hydraulic cylinder and oil is permitted to flow from the second side of the hydraulic cylinder toward said oil return passage;

said control valve having a second position in which oil is permitted to flow from said supply passage toward the second side of the hydraulic cylinder and oil is permitted to flow from the first side of the hydraulic cylinder toward said oil return passage; and said control valve having a neutral position in which oil is permitted to flow from said supply passage to said return passage.

16. A control valve as recited in claim 15, wherein said end portion of said input shaft being axially rotatable relative to said valve outer spool through a given range; and the first, second, and neutral positions corresponding to a first end, a second end, and a middle of the given range of relative rotation of said input shaft and said valve center spool, respectively.

* * * * *

UNITED STATES PATENT AND TRADEMARK OFFICE
CERTIFICATE OF CORRECTION

PATENT NO. : 5,131,486

DATED : July 21, 1992

INVENTOR(S) : Masaaki Kato and Yoshihito Imura

It is certified that error appears in the above-identified patent and that said Letters Patent is hereby corrected as shown below:

Column 4, Line 61, Claim 3, change "3" to --2--.

Column 6, Line 53, Claim 12, change "said" to --side--.

Signed and Sealed this

Twenty-first Day of September, 1993

Attest:

BRUCE LEHMAN

*Attesting Officer*   *Commissioner of Patents and Trademarks*